US 6,744,964 B1

(12) United States Patent
Vittal

(10) Patent No.: US 6,744,964 B1
(45) Date of Patent: Jun. 1, 2004

(54) SYSTEM AND METHOD FOR CONTROLLING VARIABLE OPTICAL ATTENUATORS

(75) Inventor: Chiradeep Vittal, Santa Clara, CA (US)

(73) Assignee: Ciena Corporation, Linthicum, MD (US)

( * ) Notice: Subject to any disclaimer, the term of this patent is extended or adjusted under 35 U.S.C. 154(b) by 66 days.

(21) Appl. No.: 10/027,917

(22) Filed: Dec. 20, 2001

(51) Int. Cl.[7] .................................. G02B 6/00
(52) U.S. Cl. ................ 385/140; 398/137; 398/197; 398/206
(58) Field of Search .................. 385/140; 398/137, 398/197, 206

(56) References Cited

U.S. PATENT DOCUMENTS 6,031,647 A * 2/2000 Roberts ................. 359/161
6,163,392 A    12/2000 Condict et al.
6,304,347 B1   10/2001 Beine et al.
2002/0003915 A1 * 1/2002 Sorin et al. ................. 385/7

* cited by examiner

Primary Examiner—Rodney Bovernick
Assistant Examiner—Sung Pak
(74) Attorney, Agent, or Firm—Michael R. Cammarata; Chad J. Billings; Daniel D. Tagliaferri

(57) ABSTRACT

System for adjusting a power level of an optical signal at an input to a component in a network element that forms part of an optical network. The system includes a variable optical attenuator (VOA) for receiving a first optical input signal and producing an attenuated optical output signal. A detector is coupled to the input of the component for detecting a power value of a second optical input signal that is derived from the attenuated optical output signal. A VOA controller (VOAC) includes logic for receiving the power value, via a signaling channel, and generating selected control parameters that are input to a control input of the VOA for accordingly adjusting a VOA attenuation factor to achieve a selected signal power level at the input to the component.

15 Claims, 3 Drawing Sheets

SYSTEM AND METHOD FOR CONTROLLING VARIABLE OPTICAL ATTENUATORS

FIELD OF THE INVENTION

This invention relates generally to variable optical attenuators of information networks. More particularly, embodiments of the present invention provide for a system and method for controlling a variable optical attenuator based on optical power at one or more downstream transceivers.

BACKGROUND OF THE INVENTION

Optical networks are becoming widely used for distributing both high and low speed data over varying distances. Typically, an optical network is comprised of a number of network elements (NE) that are connected to each other in a variety of configurations so as to form a unified communication network. The communication network may extend over a small area, such as a company wide network, or may cover large distances, such as in regional or nationwide networks. Typically, the NE's allow network clients to input data for transmission over the network and to receive data transmitted over the network from other locations. Thus, data may be added or dropped from the network at NE locations as the data flows from point to point throughout the network.

Typically, a network element in a wavelength division multiplexing (WDM) system includes one or more wavelength converters, that may be referred to as transceivers that convert optical signals from one wavelength to another. The transceivers are used as part of input or output tributaries associated with a network element For example, an input tributary allows a network user to input signals at an NE for transmission over the network, and an output tributary allows a network user to receive signals at an NE that have been received from the network.

FIG. 1 shows a typical WDM network element 100 that receives signals transmitted over a communication network and includes three transceivers that produce corresponding output signals to a local user. The network element couples to the communication network as shown at 102. The input signal from the network may be received by a line receiver 104. The line receiver may include at its output a variable optical attenuator (VOA) 106 that is used to adjust the power level of the received signal. For example, the VOA may be used to attenuate the received signal by a selectable attenuation factor. The output 108 of the line receiver 104 is coupled to a demulitplexer (demux) stage 110 that filters the received input signal to produce three demultiplexed signals (112, 114, 116) that are input to the three transceiver circuits 118, 120, 122, respectively. The transceiver circuits may convert their received signals to different optical wavelengths or to electrical signals for output as the respective output signals 124, 126, and 128.

It is very important to control the optical power input to the transceiver circuits (118, 120, 122) so that the transceivers operate optimally. If the power is too high, then the transceiver hardware can be damaged, and/or errors may creep into the signals. If the power is too low, then again the signals may not remain error-free. The network designer calculates the optimal receive power range for the transceiver inputs and the network installer (technician) needs to ensure that the optical received power at the transceivers is indeed in that range. For some traffic types, the optimal range is extremely narrow, such as no more than 2 dB, and so accurate transceiver input power settings are required.

In a typical optical network element, there may be one or more variable optical attenuators (VOAs) employed for controlling the magnitude of various optical powers of optical signals processed by the NE. For example, the line receiver 104 may include the VOA 106 that controls the optical power of the optical signal 108 that is input to the demux 110. Due to channel multiplexing included in the signal 102, the VOA 106 simultaneously controls the optical powers of the signals transmitted to the three transceivers. Thus, in some network element configurations, a VOA may operate to control the optical power ranges for multiple optical signals that are being transmitted to multiple downstream circuits.

A conventional VOA circuit includes a VOA controller (VOAC) 130 coupled to an optical PIN detector 132 to detect the power level at the output of the VOA 106. The optical PIN detector is a diode with a large intrinsic region sandwiched between p- and n-doped semiconducting regions. Photons absorbed in this region create electron-hole pairs that are then separated by an electric field, thus generating an electric current in a load circuit. The software operating on the VOAC implements a closed loop control of the optical output power of the VOA 106 by reading the PIN detector 132 and making adjustments to a VOA attenuation factor of the VOA 106 via control line 134, to achieve a desired optical output power from the VOA 106. The foregoing approach is problematic in the sense that while the desired intent is to control the optical power that is being received at the transceivers, the optical power that is actually being controlled is the power at the output of the VOA 106.

The software at the VOAC 130 controls optical output power to achieve an estimated received power at the transceivers by estimating the expected optical losses between the VOA output 108 and the transceivers. The software on the VOAC also assumes that the input power at the VOA 106 is comprised of channels at equal power levels. The estimated optical received power at the transceivers is typically wrong because the estimates of optical losses between the VOA output 108 and the transceivers are not accurate; and the power levels of the channels received at the VOA input may not be perfectly equalized. The software on the VOAC can only estimate the individual power of each channel at the output of the VOA through equal allocation of the total power among the channels. A wrong estimate can mean that the received optical power at one or more of the transceivers is outside the optimal range.

The VOA, however, can also be operated in an open-loop or incoming fashion where the VOA attenuation factor is set to a fixed level under manual control. In a manual control operation, a network operator or installer calculates or measures the received optical power at the transceivers (i.e., using an optical power meter), and after detection of the incoming optical power at the transceivers, the operator sets the fixed VOA attenuation factor in an attempt to achieve the optimal setting. A wrong adjustment by the operator could result in irreparable damage to one or more of the transceivers. Thus, a VOA operating in open-loop mode is unable to accommodate changes (e.g., due to aging or network upgrades) in the attenuation of the VOA, and may risk damaging expensive network components.

Therefore, what is needed and what has been invented is a system and method for adjusting optical signal power levels received at one or more transceivers without relying on an operator to monitor the optical power of optical signals, and accordingly adjust the VOA attenuation factor in an attempt to achieve a desired optical setting. The system and method of the present invention implements a distributed closed-loop operation of the VOA. Instead of using the optical power measured at the PIN detector 132 at the output of the VOA 106, the system and method of the present invention utilize optical power reading at one or more downstream transceivers to adjust the VOA attenuation settings.

SUMMARY OF THE INVENTION

The present invention provides a system and method for adjusting optical signal power levels in an optical network. The system comprises a variable optical attenuator (VOA) for receiving an input signal and producing an attenuated optical output signal. A VOA controller (VOAC) is coupled to the VOA for adjusting a VOA attenuation factor of the VOA from optical power level changes detected at downstream network components. For example, the power level at any downstream component or circuit card input can be detected and controlled in accordance with the present invention.

In one embodiment of the invention, the power level input to a transceiver circuit pack is controlled in accordance with the present invention. The transceiver circuit pack is optically coupled to receive an optical input signal derived from the attenuated optical output signal output from the VOA. The transceiver includes an optical power level detector optically communicating with the optical input signal for detecting the optical input signal and producing a detected optical power level value. The system for adjusting optical signal power also comprises a signaling channel coupled to the detector and the VOAC for transmitting the power level value from the detector to the VOAC. The VOAC receives the power level value and accordingly adjusting the VOA attenuation factor of the VOA to achieve a desired power level value at the input of the transceiver.

In one embodiment of the invention, a system is provided for adjusting a power level of an optical signal at an input to a component in a network element that forms part of an optical network. The system includes a variable optical attenuator (VOA) for receiving a first optical input signal and producing an attenuated optical output signal. The VOA includes a control input to receive control parameters that adjust a VOA attenuation factor. The system also includes a signaling channel and a detector coupled to the input of the component for detecting a power value of a second optical input signal that is derived from the attenuated optical output signal. The detector is further coupled to the signaling channel and includes logic to transmit the power value on the signaling channel. The system also includes a VOA controller (VOAC) coupled to the VOA and the signaling channel. The VOAC includes logic for receiving the power value from the signaling channel and generating selected control parameters that are input to the control input of the VOA for accordingly adjusting tho VOA attenuation factor to achieve a selected signal power level at the input to the component.

In one embodiment of the invention, a method is provided for adjusting a power level of an optical signal at an input to a component in a network element that forms part of an optical network. The method includes the steps of attenuating a first optical signal with a VOA to produce an attenuated optical signal, the VOA having a plurality of attenuation factors, transmitting a second optical signal that is derived from the attenuated optical signal to the input of the component, detecting a power value for the second optical signal at the input of the component, and selecting one of the VOA attenuation factors based on the power value so that a selected power value is detected at the input of the component.

These provisions together with the various ancillary provisions and features, which will become apparent to those skilled in the art as the following description proceeds, are attained by the systems and methods of the present invention, preferred embodiments thereof being shown with reference to the accompanying drawings, by way of example only.

DESCRIPTION OF PREFERRED EMBODIMENTS OF THE PRESENT INVENTION

The present invention includes a system and method to optimize input power at any component in a network element (NE) that forms part of an optical network. For example, the system may be used to optimize the input power to an optical receiver in a network element. In one embodiment, the system includes a detector that measures the input power to the optical receiver. The input power is then communicated to a VOAC that creates control parameters to control an attenuation factor of an upstream VOA. The improved system results in highly accurate power settings that protect receiver cards from damage and provides cost savings, since it is not necessary to maintain and manually adjust network elements in response network changes or switching events. However, the invention is not limited to setting the power levels at only optical receiver circuit cards, and can be used to set input power levels at virtually any type of network card or component. For example, the power level input to other network cards, such as multiplexers or demultiplexers may be controlled in accordance with the present invention. Furthermore, the input power level at a downstream component, such as a second VOA component, can be controlled utilizing one or more embodiments of the present invention. Thus, various embodiments of the system included in the present invention are discussed in detail in the following text.

Figure 1:
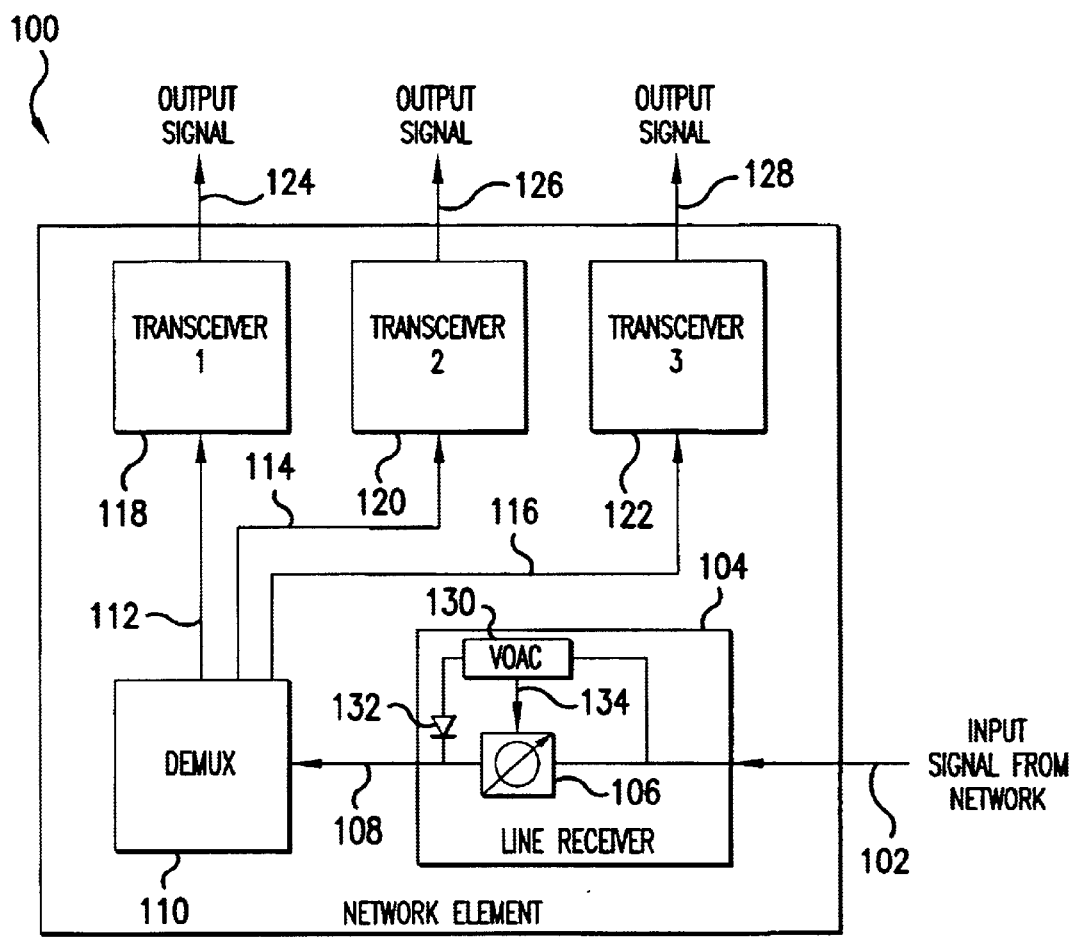
FIG. 1 illustrates a functional diagram of a typical network element including three transceiver circuits.
Figure 2:
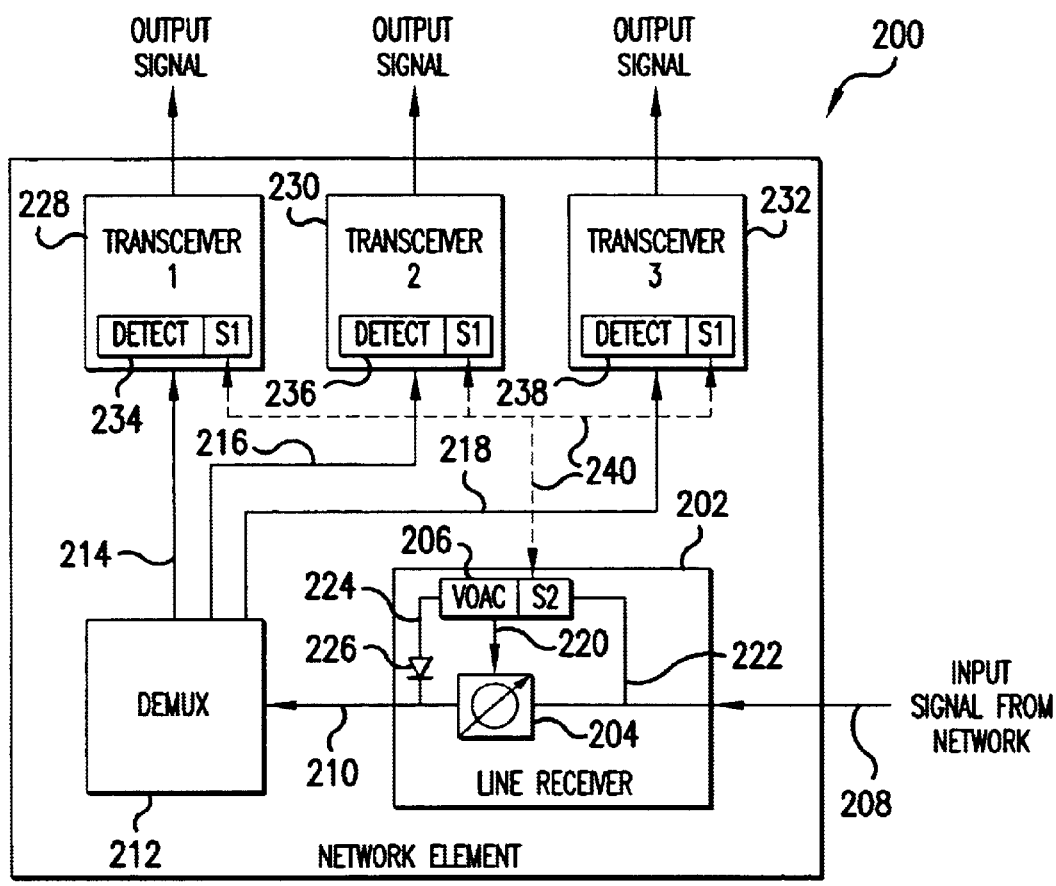
FIG. 2 illustrates a functional diagram of one embodiment of a system for adjusting optical signal power levels in an optical network in accordance with the present invention.

FIG. 2 illustrates a functional diagram of one embodiment of a system 200 for adjusting optical signal power levels in an optical network in accordance with the present invention. There is shown in FIG. 2 a network element that includes a line receiver circuit card, generally illustrated as 202, which may be designed as a detachable module or removable card that is installable in the network element. Receiver circuit card 202 comprises a variable optical attenuator (VOA) 204 and a VOA controller (VOAC) 206.

The VOA 204 is used to attenuate optical signals by adjustable attenuation factors. For example, an optical signal having a level of −5 dBm may be attenuated by 5 dB to produce an output signal having a level of −10 dBm. The VOA 204 and VOAC 206 form a VOA control loop that monitors input and output signal power levels, and provides adjustable attenuation by responding quickly to small changes in the input power level to maintain a target output power level. Thus, the VOA 204 and VOAC 206 control power fluctuations, Small power fluctuations are adjusted for automatically. However, large power fluctuations, especially power fluctuations larger than the relative power of a single wavelength, may cause the VOA 204 and VOAC 206 to suspend attenuation control.

As further best shown in FIG. 2, the VOA 204 is coupled to an input signal 208. As previously indicated, the VOA 204 can attenuate the input signal 208 by adjustable attenuation factors to produce an attenuated signal 210. The attenuated signal 210 is processed by demux card logic 212 to produce three output signals 214, 216, 218. As also previously indicated, the VOAC 206 is coupled to the VOA 204 to provide a VOA control loop that can adjust the attenuation of the VOA 204 based on optical power level changes that occur to the input signal 208. For example, the VOAC 206 adjusts the attenuation of the VOA 204 so that small power fluctuations on the input signal 208 produce a constant target power on the attenuated signal 210.

More specifically, and by way of further example, the VOAC 206 selects the attenuation factor via an attenuation control line 220 coupled between and to both the VOA 204 and the VOAC 206. Two signal level monitoring inputs 222, 224 couple the input signal 208 and the attenuated signal 210 to the VOAC 206, respectively. An optical PIN detector 226 is provided for detecting the attenuated signal 210. The VOAC 206 uses the monitoring inputs 222, 224 to detect signal level changes and to adjust the attenuation factor of the VOA 204 to achieve a specific target power level for the attenuated signal 210. The receiver circuit card 202 utilizes the VOA 204 to provide the capability to operate over a wide dynamic range of input signal levels. It is to be understood that although the receiver circuit card 202 has the VOA 204 coupled to the input signal 208, other embodiments of internal components of a network element may have the VOA 204 located at a different circuit card and coupled to different signals in the network element. It will be apparent to one skilled in the art that different arrangements of the VOA 204 and VOAC 206 within the receiver circuit card 202 are possible without deviating from the spirit and scope of the present invention.

The demux card logic 212 is representative of different processing functions and/or signal routing that may occur within the network element. For example, the card logic 212 can represent a signal multiplexer or signal demultiplexer where input signals are combined or split apart, respectively, to form output signals. The card logic 212 has signal input 210, where one or more optical signal channels are input, and signal outputs 214, 216, and 218, where one or more optical signal channels derived from the input signal 210 are output. Based on the process performed by the card logic 212, power level changes can occur between the input and output signals due to the signal routing, signal combining, signal splitting and/or internal losses.

Three transceiver circuits 228, 230, and 232 are optically coupled to receive signal channels from the receiver circuit card 202 through the demux card 212. For example, the transceivers 228, 230, and 232 receive the signals 214, 216, and 218, respectively. The signals 214, 216, and 218 are derived from, and include portions of signal channels from the attenuated signal 210.

The three transceiver circuits 228, 230, and 232 include detector logic 234, 236 and 238, respectively. The detector logic includes software (S1) that runs at each detector to process information determined by the detectors. The detector logic 234, 236 and 238 are coupled to a signaling channel 240 that is also coupled to the VOAC 206. The signaling channel allows information to be communicated between the detector logic and the VOAC. The signaling channel may comprise virtually any suitable communication channel. For example, the signaling channel can be a local network connection, or may be a dedicated communication channel. In another embodiment, the signaling channel may be part of a larger control channel that is part of the network element and extends to other network elements or network entities. For example, the signaling channel may be part of an optical supervisory channel (OSC) (not shown) that extends to multiple network elements to provide operational parameters to the network elements and receive operational data from the network elements.

The detector logic 234, 236 and 238 include power level detectors (not shown), such as optical PIN detectors, for detecting the power level of the input signals received at each transceiver. The detector logic may also comprise any other suitable means for detecting the signal power of the incoming signals. The detector logic 234, 236 and 238 also include detector processors (not shown), respectively, that execute transceiver software S1 that operates to process the detected input power values and transmit the power values via the signaling channel to the VOAC 206. In one embodiment, the detector processors comprises simple hardware logic to value and transmit the detector power values over the signaling channel.

The VOAC 206 includes a processor (not shown) that executes VOAC software (S2) that is responsible for the control of the VOA 204 and controls communications over the signaling channel 240. The VOAC software S2 is initially configured with the identities of one or more of the transceivers that receive signals whose optical power is controlled by the VOA 204. At initialization time, the VOAC software S2 communicates, via the signaling channel, with the transceiver software S1 running at each transceiver to determine the optimal received optical power for each transceiver. Each transceiver may also provide an associated priority level, whereby the VOAC software may determine an order of priority for the three transceivers.

During operation, the detector software S1 determines the optical power of the input signals received at their respective transceiver. The software S1 operated to cause the determined optical powers to be transmitted to the VOAC via the signaling channel 240. Upon reception of the power values, the VOAC software S2 operates to determine the identity of the targeted transceiver whose optical input power it wishes to control. For example, the VOAC software may determine the targeted transceiver by the transceivers' priority values, or from control parameters pre-programmed into the VOAC. The VOAC software S1 then begins closed loop operation to control the received power at the targeted transceiver. The VOAC software S1 operates to control the operation of the VOAC to adjust the VOA 204 attenuation factor such that the received optical power at the target transceiver is in a selected range. The optical power values determined at the targeted transceiver and received at the VOAC via the signaling channel 240 are used to make the adjustments. For example, if the input power at the targeted transceiver is too high, then the VOA attenuation factor is increased. If the input power at the targeted transceiver is too low, then the VOA attenuation factor is decreased. The desired power range for each transceiver may be pre-programmed in the VOAC or may be communicated to the VOAC from each transceiver via the signaling channel 240.

The closed-loop adjustment procedure may be continuously repeated to maintain the selected power level at the targeted transceiver. As a result, adjustments to the power level at the targeted transceiver by the software-controlled VOAC simplify network installation and network upgrades by not requiring the user to be physically present at every site. The methods and systems included in embodiments of the present invention adjust the VOA using the actual received power at the transceiver input making it extremely accurate, and thereby avoiding the errors that occur in conventional systems due to incorrectly estimated optical losses and unequalized channel powers.

Figure 3:
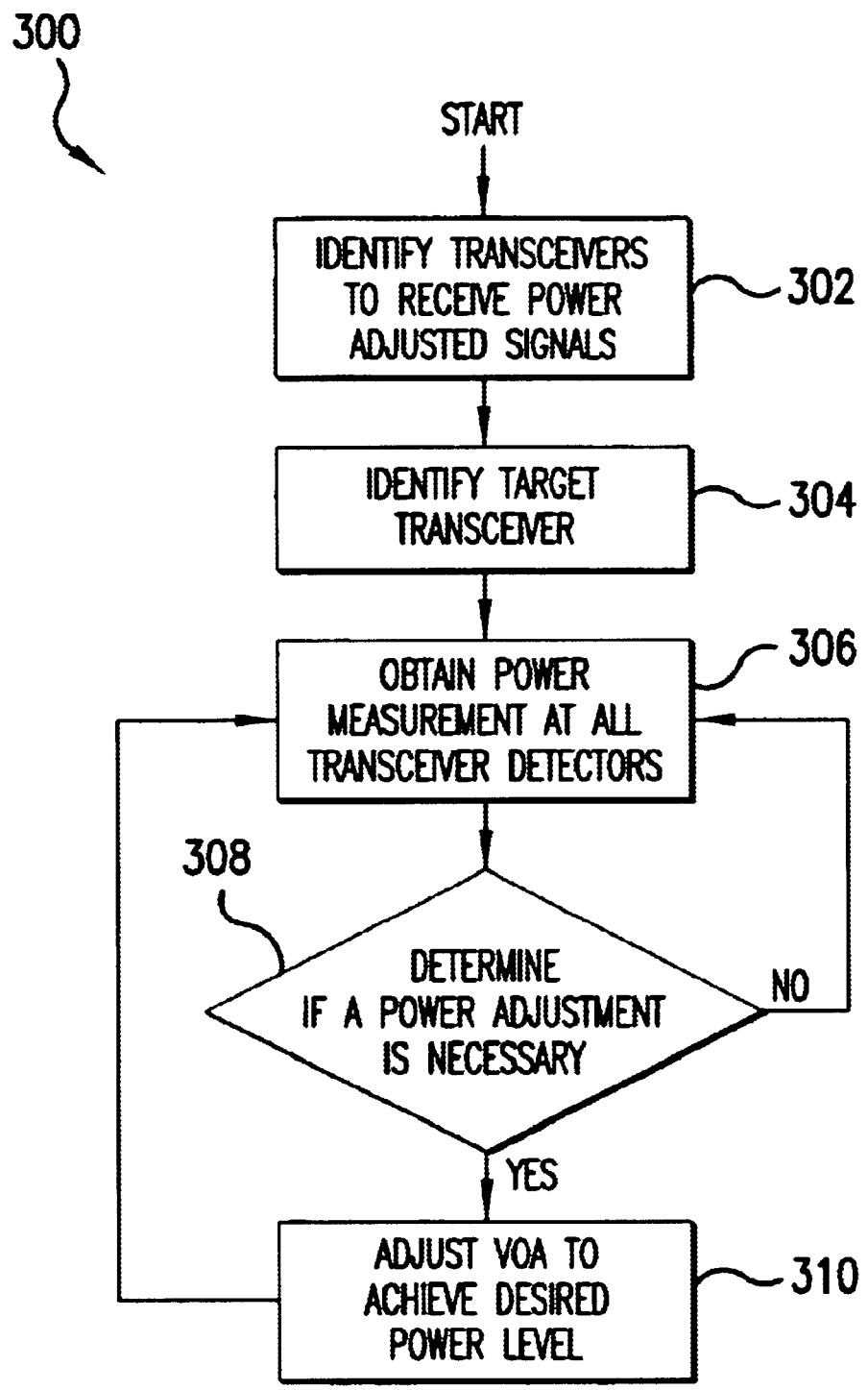
FIG. 3 illustrates a flow diagram of one embodiment of a method for adjusting optical signal power levels in an optical network in accordance with the present invention.

FIG. 3 illustrates a flow diagram of one embodiment of a method 300 for adjusting optical signal power levels in an optical network in accordance with the present invention. The method begins at step 302 where transceivers whose input power is to be adjusted are identified. For example, the transceivers and the VOAC exchange messages to identify the transceivers, and optionally, a priority level for each transceiver.

At block 304, a selected transceiver is selected to be the targeted transceiver. The targeted transceiver is the transceiver whose input power will be controlled in accordance with the present invention. For example, the transceiver with the highest priority may be determined to be the targeted transceiver.

At block 306, power parameters that identify the power levels at the inputs of all transceivers are obtained by the VOAC. For example, software running at the detector logic at each transceiver operates to obtain input power level values at their respective transceiver and transmit these values to the VOAC via the signaling channel. In one embodiment, the software at the detectors periodically transmit power level values to the VOAC. In another embodiment, the VOAC polls the detectors to new power level values.

At block 308, a test is performed to determine if a power level adjustment is required to obtain a desired power level at the input to the targeted transceiver. For example, the detected power level at the input of the targeted transceiver is sent to the VOAC via the signaling channel. The software S2 at the VOAC determines if the power level received is within the range specified for the transceiver. For example, the desired power range may have been previously specified by the targeted transceiver, or the range may have been previously provided to the VOAC by a network administrator. If the received power level is within the specified range for the targeted transceiver, then no power adjustment is necessary and the method proceeds to block 306. If the received power level is outside the specified range, then a power level adjustment is necessary and the method proceeds to block 310.

In one or more embodiments of the invention, the desired range for the input power level of the targeted transceiver may be provided in several ways. In one embodiment, the range is received from a network administrator via a supervisory signaling channel. In another embodiment, each transceiver indicates the range it desires via the signaling channel 240. There are many other variation and techniques possible for the VOAC to determine a desired input power range for each transceiver, and so it is understood that any suitable technique to communicate desired power ranges to the VOAC are within the scope of the present invention.

At block 310, the attenuation factor of the VOA is adjusted to achieve the desired input power for the targeted transceiver. For example, if the input power level at the targeted transceiver is above the desired power range for that transceiver, then the software S2 running at the VOAC operates to generate control parameters that are transmitted to the VOA 204 to increase its attenuation factor and thereby reduce the power level at the targeted transceiver. After the adjustment to the attenuation factor of the VOA is completed, the method proceeds to block 306, where new power parameters are obtained to determine if additional adjustments are required.

In an alternative embodiment, the determination of whether to adjust the VOA is based on more than just the power level at the targeted VOA. In one embodiment, the determination takes into account the effect on the other transceivers. For example, the adjustment to the VOA will not be made, or may be made to a limited extent, based on whether the adjustment will adversely affect one or more of the other transceivers. If the VOA adjustment will result in dangerously high power levels input to one or more of the other transceiver, the VOAC will reduce the adjustment to the extent necessary to protect the other transceivers. It will be apparent to those with skill in the art that adjustments to the VOA to control the input power level to a targeted transceiver can be modified to account for power level requirements at those other transceivers. Therefore, such modifications are understood and are within the scope of the present invention.

Although the above embodiments describe the adjustment of one VOA, it is also possible within the scope of the invention that the provided systems and method operate to adjust more than one VOA. In one embodiment, two or more VOAs and their associated VOACs are located in a network element and operate to adjust the power level of multiple signal channels, where one or more of the signal channels are common to both VOAs. In such a configuration, adjustment of the power level of the common signal channels by one VOA may affect adjustments to the same signal channel by other VOAs. In one embodiment, the VOAs' closed-loop operation is free running so that as one VOA loop increases signal power to a first transceiver, (which affects the input signal power at a second transceiver) a second VOA loop operates to reduce the signal power to the second transceiver. In other embodiments, the VOAs are prioritized so the each VOA makes a small adjustment, and all the VOAs make their respective adjustments in a selected sequence. It will become obvious to one with skill in the art that one or more embodiments of the invention can be modified so that the provided systems and method operate to adjust multiple VOAs having one or more common signal channels.

In another embodiment of the present invention, if the VOAC makes an adjustment to the attenuation factor of a VOA, whereby the signal power level at the targeted transceiver is increased, then the VOAC operates to recommend attenuation values to be used at the inputs to the other transceivers to offset the adjustment. For example, fixed attenuators, referred to "pads", have a fixed attenuation value and may be placed in the signal paths to the other transceivers. In one embodiment, the VOAC sends its pad recommendation over a supervisory signaling channel to a network operator. The operator may then make adjustments to the signal paths of the remaining transceivers to compensate for the adjustment to the targeted transceiver by the VOA.

In another embodiment of the present invention, the detected power level at the input of the transceiver is transmitted via an OSC channel to a VOAC located at another network element that is located upstream from the network element containing the transceiver. The upstream VOAC operates to adjust the attenuation factor of an associated upstream VOA so that the input signal power at the transceiver can be controlled. Thus, in one or more embodiments included in the present invention, adjustments to signal powers may be made at other network elements to control the input power at a selected network component.

For the purposes of clarity the above embodiments have been described with reference to a wavelength division network where signals may include multiple signal channels at different wavelengths. However, in one or more embodiments of the invention, the described systems and methods can be modified or adjusted as needed to operate in non-wavelength division systems. Thus, one or more embodiments of the invention are suitable of use in various types of communication networks.

Although described with reference to adjusting the power levels at transceiver circuits in a network element, it will be apparent that the systems and methods included in the present invention can be used to adjust the power levels at any component or circuit in a network element. Therefore, while the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope and spirit of the invention as set forth. As a result, many modifications may be made to adapt a particular situation or material to the teachings of the invention without departing from the essential scope and spirit of the present invention. It is intended that the invention not be limited to the particular embodiment disclosed as the best mode contemplated for carrying out this invention, but that the invention will include all embodiments and equivalents falling within the scope of the appended claims.

What is claimed is:

1. A system for adjusting a power level of an optical signal at an input to a component in a network element that forms part of an optical network, the system comprising:
   a variable optical attenuator (VOA) for receiving a first optical input signal and producing an attenuated optical output signal, the VOA including a control input to receive control parameters that adjust a VOA attenuation factor;
   a signaling channel;
   a detector coupled to the input of the component for detecting a power value of a second optical input signal that is derived from the attenuated optical output signal, and wherein the detector is further coupled to the signaling channel and includes logic to transmit the power value on the signaling channel; and
   a VOA controller (VOAC) coupled to the VOA and the signaling channel, the VOAC including logic for receiving the power value from the signaling channel and generating selected control parameters that are input to the control input of the VOA for accordingly adjusting the VOA attenuation factor to achieve a selected signal power level at the input to the component.

2. The system of claim 1, wherein the signaling channel comprises a direct connection between the detector and the VOAC.

3. The system of claim 1, wherein the signaling channel comprises a local network coupled to the detector and the VOAC.

4. The system of claim 1, wherein the first optical input signal includes a plurality of signal channels, and wherein the second optical input signal includes a selected portion of the signal channels.

5. The system of claim 1, wherein the attenuated optical output signal is input to a second network component, and the second network component derives the second optical input signal from the attenuated optical output signal.

6. The system of claim 5, wherein the second network component is a demux circuit card located in the network element.

7. The system of claim 1, wherein the component is an optical receiver.

8. The system of claim 1, wherein the network element is a first network element and VOA and the VOAC are located at a second network element, and wherein the signaling channel is part of an optical supervisory channel that extends between the first and second network elements.

9. A method for adjusting a power level of an optical signal at an input to a component in a network element that forms part of an optical network, the method comprising steps of:
   attenuating a first optical signal with a VOA to produce an attenuated optical signal, the VOA having a plurality of attenuation factors;
   transmitting a second optical signal that is derived from the attenuated optical signal to the input of the component;
   detecting a power value for the second optical signal at the input of the component;
   selecting one of the VOA attenuation factors based on the power value so that a selected power value is detected at the input of the component.

10. The method of claim 9, further comprising a step of repeating the steps of detecting and selecting until a selected power value is detected at the input of the component.

11. The method of claim 10, wherein the component is an optical receiver.

12. The method of claim 9, wherein the VOA includes a VOA controller (VOAC) and the method further comprises a step of signaling the power value to the VOAC.

13. The method of claim 12, wherein the network element is a first network element and VOA and the VOAC are located at a second network element, and wherein the step of signaling comprises a step of signaling the power value to the VOAC over an optical supervisory channel that extends between the first and second network elements.

14. The method of claim 9, wherein the first optical input signal includes a plurality of signal channels, and wherein the second optical signal includes a selected portion of the signal channels.

15. The method of claim 14, further comprising steps of:
   receiving the plurality of signal channels at a demux circuit; and
   outputting the selected portion of the signal channels from the demux circuit to the component.

* * * * *